(12) United States Patent
Lu et al.

(10) Patent No.: US 11,967,170 B2
(45) Date of Patent: Apr. 23, 2024

(54) BIOMETRIC INFORMATION ACQUISITION SYSTEM AND PROCESSING METHOD

(71) Applicant: Chipone Technology (Beijing) Co., Ltd., Beijing (CN)

(72) Inventors: Zhenghua Lu, Beijing (CN); Chenlong Man, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/926,590

(22) PCT Filed: May 18, 2021

(86) PCT No.: PCT/CN2021/094425
§ 371 (c)(1),
(2) Date: Nov. 19, 2022

(87) PCT Pub. No.: WO2021/233308
PCT Pub. Date: Nov. 25, 2021

(65) Prior Publication Data
US 2023/0206680 A1     Jun. 29, 2023

(30) Foreign Application Priority Data
May 20, 2020    (CN) .......................... 202010429007.0

(51) Int. Cl.
*G06V 40/13*      (2022.01)
*G06F 21/32*      (2013.01)
(Continued)

(52) U.S. Cl.
CPC .......... *G06V 40/1318* (2022.01); *G06F 21/32* (2013.01); *G06V 10/758* (2022.01);
(Continued)

(58) Field of Classification Search
CPC ............ G06V 40/1318; G06V 10/758; G06V 40/1353; G06V 40/1359; G06V 40/1376;
(Continued)

(56) References Cited

U.S. PATENT DOCUMENTS

2010/0183200 A1    7/2010   Wu
2017/0316248 A1*   11/2017   He .......................... G06F 18/24

FOREIGN PATENT DOCUMENTS

CN        105989335       10/2016
CN        107945163        4/2018
(Continued)

*Primary Examiner* — Abhishek Sarma
(74) *Attorney, Agent, or Firm* — Treasure IP Group, LLC

(57) ABSTRACT

Disclosed is a biometric information acquisition system and a processing method thereof. The biometric information acquisition system comprises a transparent substrate; a light source; a photoelectric conversion device, which is located at one side of the transparent substrate with the light source, receives light reflected by the transparent substrate and generates electrical signals; a processing device for obtaining biometric information based on the electrical signals. At least a portion of the transparent substrate is made of flexible material, and fits a predetermined portion of an organism on the other side of the transparent substrate based on a curved interface, therefore, ambient light incident to the photoelectric conversion device is reduced, an interference caused by the ambient light is reduced, accuracy of acquiring biometric characteristic information is improved. Because fitting with the curved interface can increase contact area, more biometric characteristic information of the predetermined portion can be obtained.

13 Claims, 6 Drawing Sheets

(51) Int. Cl.
*G06V 10/75* (2022.01)
*G06V 40/12* (2022.01)

(52) U.S. Cl.
CPC ...... *G06V 40/1353* (2022.01); *G06V 40/1359* (2022.01); *G06V 40/1376* (2022.01)

(58) Field of Classification Search
CPC . G06V 40/1347; G06V 40/1365; G06F 21/32
See application file for complete search history.

(56) References Cited

FOREIGN PATENT DOCUMENTS

| | | |
|---|---|---|
| CN | 107945163 A | 4/2018 |
| CN | 108875643 | 11/2018 |
| CN | 109670478 | 4/2019 |
| CN | 11027516 | 4/2020 |
| CN | 111310620 | 6/2020 |
| CN | 111723665 | 9/2020 |
| JP | 2004173827 A | 6/2004 |

\* cited by examiner

BIOMETRIC INFORMATION ACQUISITION SYSTEM AND PROCESSING METHOD

CROSS-REFERENCE TO RELATED APPLICATION

The present disclosure is a Section 371 National Stage application of International Application No. PCT/CN2021/094425, which is filed on 18 May 2021 and published as WO 2021/233308 A1 on 25 Nov. 2021, and claims priority to a Chinese patent application No. 202010429007.0, filed on May 20, 2020, entitled "entitled "Biometric Information Acquisition System and Processing Method", the entire contents of which are incorporated herein by reference in their entireties.

FIELD OF THE DISCLOSURE

The present disclosure relates to a field of biometric information acquisition technology, in particular to a biometric information acquisition system and a processing method.

DESCRIPTION OF THE RELATED ART

Biometric identification technology is used to acquire biometric characteristics through a sensor, and then compare the acquired biometric characteristics with biometric characteristics stored in the system, so as to perform identity authentication. Acquiring biometric information is an important step in a biometric identification process.

Optical biometric information acquisition technology is widely used at present, which uses the principle of total reflection of light to acquire characteristic information of a predetermined portion of an organism. In the prior art, the predetermined portion 10 of the organism needs to be pressed on a transparent substrate 100 made of rigid material, as shown in FIG. 1a, wherein only a tangent plane of the predetermined portion 10 is in contact with the transparent substrate 100 made of rigid material, so that a contact area between the predetermined portion 10 and the transparent substrate 100 is small. Within an acquisition area, only part of effective information of the predetermined portion 10 can be acquired. For example, when a center of the predetermined portion 10 comes into contact with the transparent substrate 100 made of rigid material, only central texture 11 of the predetermined portion 10 can be acquired, as shown in FIG. 1b, and peripheral texture of the predetermined portion 10 cannot be effectively acquired. Therefore, it is necessary to change the contact position of the predetermined portion 10 several times and integrate the acquired information to obtain complete information of the predetermined portion 10.

At the same time, since the transparent substrate 100 is in tangential contact with the predetermined portion 10, acquisition accuracy is easily interfered by ambient light around the contact position, so that security of the biometric information acquisition system is poor, and because the biometric information acquisition system of the prior art can only acquire texture information of the predetermined portion 10, and the texture information is easy to be reproduced, security of the system is further reduced. In addition, since the transparent substrate 100 made of rigid material is fragile, not only a replacement cost may be increased, but also a damage to the organism may be easily caused.

Therefore, it is expected to provide an improved biometric information acquisition system and a processing method, so as to improve acquisition efficiency and accuracy, and then improve security performance of the biometric information acquisition system.

SUMMARY

In view of the above problems, an objective of the present disclosure is to provide an improved biometric information acquisition system and a processing method, wherein at least a portion of a transparent substrate is made of flexible material, so that a contact area between a predetermined portion of an organism and the transparent substrate is increased, and an interference caused by ambient light is reduced at the same time, thus improving acquisition efficiency and acquisition accuracy of the biometric information acquisition system.

According to one aspect of an embodiment of the present disclosure, a biometric information acquisition system is provided, and comprises: a transparent substrate; a light source; a photoelectric conversion device, which is located at one side of the transparent substrate with the light source, and is configured to receive light reflected by the transparent substrate and generate corresponding electrical signals; and a processing device, configured to obtain biometric information according to the electrical signals, wherein at least a portion of the transparent substrate is made of flexible material.

In some embodiments, the biometric information comprises central texture information, peripheral texture information and pore information of a predetermined portion of an organism.

In some embodiments, the photoelectric conversion device comprises an array of photodiodes, each of which is configured to convert received light into a corresponding one of the electrical signals, wherein a distance between centers of two adjacent ones of the photodiodes is not greater than 90 μm.

In some embodiments, the processing device comprises: a processing unit, configured to provide a control signal; a control unit, configured to turn on a corresponding row of the photodiodes in the array according to the control signal, wherein each one of the photodiodes is configured to convert received light into a corresponding one of the electrical signals when that photodiode is turned on; a rectification feedback unit, configured to generate an analog voltage signal according to the corresponding one of the electrical signals; a conversion unit, configured to generate a digital signal according to the analog voltage signal and transmit the digital signal to the processing unit, wherein the processing unit is configured to obtain an image to be detected representing the biometric information according to the digital signal.

In some embodiments, the analog voltage signal is sampled by the conversion unit at a sampling frequency which is not less than 16 bits.

In some embodiments, a light emitting side of the light source faces the transparent substrate.

In some embodiments, the biometric information acquisition system contains an electronic device, which is any one of a smart phone, a tablet computer, a notebook computer and an access control device.

According to another aspect of embodiments of the present disclosure, a processing method is provided, and is implemented based on the biometric information acquisition system according to the embodiments of the present disclosure. The processing method comprises: obtaining an initial image of the predetermined portion according to the electrical signals provided by the photoelectric conversion device; performing a first histogram equalization algorithm on the initial image to obtain a first image, so as to make a grayscale value distribution range of valleys and ridges in the first image greater than a grayscale value distribution range of valleys and ridges in the initial image; and obtaining first texture information of the predetermined portion based on the first image.

In some embodiments, the processing method further comprises: selecting an intermediate sub-interval within the grayscale value distribution range of the valleys and the ridges in the first image; performing a second histogram stretching algorithm on grayscale values of a plurality of designated pixels in the first image, so as to process the first image into a second image, wherein the grayscale values of the plurality of designated pixels are distributed within the intermediate sub-interval, and a grayscale value distribution range of the plurality of designated pixels in the second image is greater than a grayscale value distribution range of the plurality of designated pixels in the first image; and obtaining second texture information and/or pore information of the predetermined portion based on the second image.

In some embodiments, the processing method further comprises: performing binarization processing on a grayscale value of each pixel in the second image, so as to convert the second image into a binary image; and obtaining characteristic information used for identifying the predetermined portion based on the binary image.

In some embodiments, the processing method further comprises: judging whether the organism is an authenticated user based on the first texture information.

In some embodiments, the processing method further comprises: preliminarily judging whether the organism is an authenticated user according to the first texture information; if yes, judging whether the organism is an authenticated user again based on the characteristic information.

According to the biometric information acquisition system and the processing method provided according to embodiments of the present disclosure, at least a portion of the transparent substrate is made of flexible material, so that the transparent substrate can fit the predetermined portion of the organism based on a curved interface during a biometric information acquisition process. Compared with the prior art, a contact area realized by fitting with the curved interface is larger than that a contact area realized by fitting with a tangential interface, so that more biometric characteristic information of the predetermined portion can be obtained at one time, and acquisition efficiency is improved. At the same time, fitting with the curved interface can reduce ambient light incident to the photoelectric conversion device, reduce an interference caused by the ambient light, and improve an accuracy of obtaining biometric information, thus improving security of the biometric information acquisition system.

Furthermore, since the ambient light incident to the photoelectric conversion device can be reduced, the interference of the ambient light can be reduced, not only central texture information and peripheral texture information can be clearly obtained, but also the characteristic information of sweat pores can be obtained, which increases the difficulty of reproducing the characteristic information, thus further improving the security of the biometric characteristic information acquisition system.

Further, since the ambient light incident to the photoelectric conversion device is reduced, the interference of the ambient light can be reduced, the first histogram equalization algorithm or both the first histogram equalization algorithm and the second histogram stretching algorithm can be directly used to obtain the texture information and the pore information of the predetermined portion, thereby improving image processing speed.

In addition, since at least a portion of the transparent substrate in contact with the predetermined portion is made of flexible material, the biometric information acquisition system may not be easily damaged by an external stress.

BRIEF DESCRIPTION OF THE DRAWINGS

The above and other objects, features and advantages of the present invention will become more apparent from the following description of embodiments of the present disclosure with reference to the accompanying drawings, in which.

DETAILED DESCRIPTION OF EMBODIMENTS OF THE DISCLOSURE

Figure 1A:
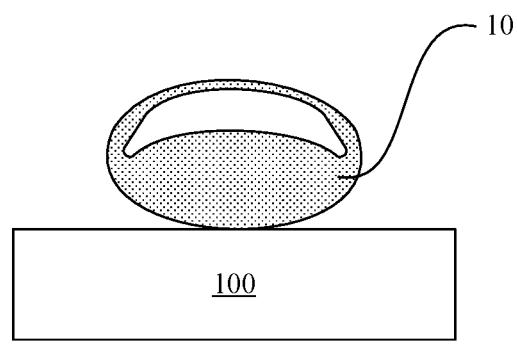
FIG. 1a shows a schematic diagram of a biometric information acquisition method according to the prior art.
Figure 1B:
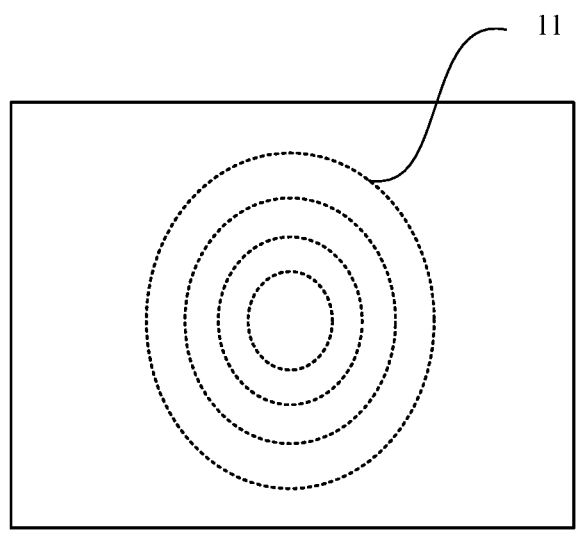
FIG. 1b shows a schematic diagram of a biometric information acquisition effect according to the prior art.

Various embodiments of the present invention will be described in more detail below with reference to the accompanying drawings. Throughout the various figures, like elements are denoted by same or similar reference numerals. For the sake of clarity, various parts in the drawings are not drawn to scale. In addition, some well-known parts may not be shown in the figures.

Specific embodiments of the present disclosure are described in further detail below with reference to the accompanying drawings and embodiments. Many specific details of the present disclosure, such as a process, a technique, a structure, a material and a dimension of a component, are described hereinafter, in order to make the present disclosure well understood. However, as will be understood by those skilled in the art, the present disclosure may be implemented without these specific details.

It should be understood that, when a structure of a device is described, in a case that one layer or one region is referred to as being located "on" or "above" another layer or another region, it means the one layer or the one region is located above another layer or another region, with or without additional layers or additional regions therebetween. Moreover, in a case that the device is turned upside down, the one layer or the one region will be "under" or "below" another layer or another region.

Figure 2A:
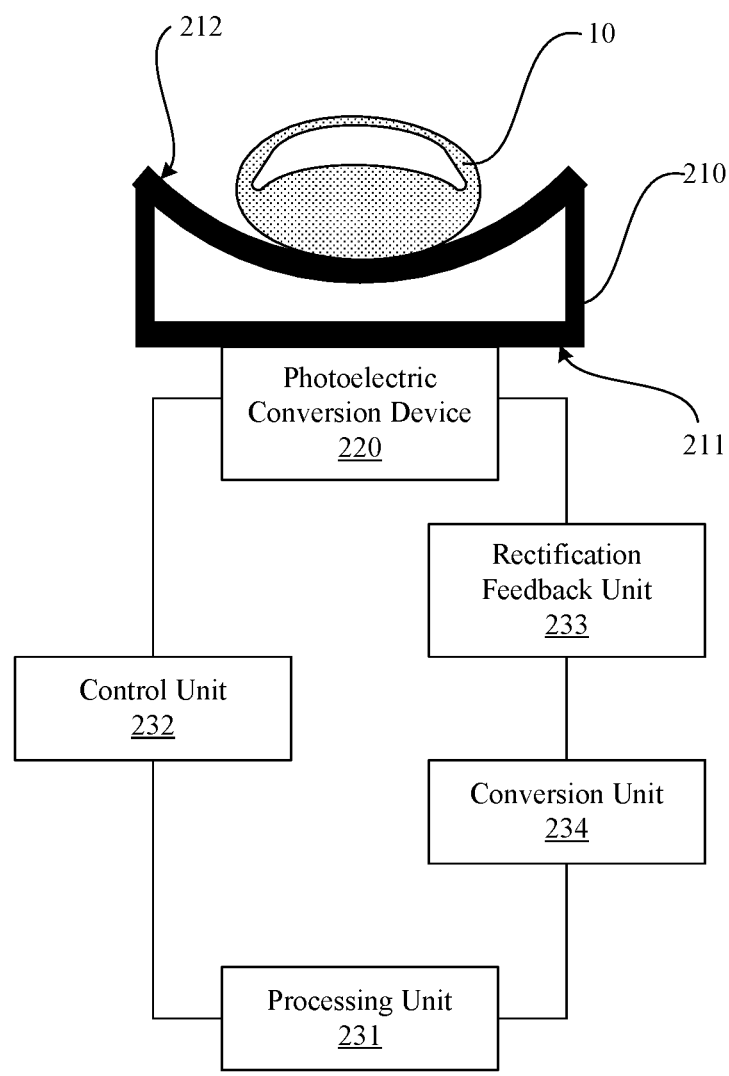
FIG. 2a shows a schematic diagram of a biometric information acquisition system according to an embodiment of the present disclosure.

FIG. 2a shows a schematic diagram of a biometric information acquisition system according to an embodiment of the present disclosure.

As shown in FIG. 2a, the biometric information acquisition system according to the embodiment of the present disclosure comprises: a transparent substrate 210, a photoelectric conversion device 220, a processing device and a light source (not shown). The processing device comprises: a processing unit 231, a control unit 232, a rectification feedback unit 233, and a conversion unit 234. The biometric information acquisition system according to the embodiment of the present disclosure may contain an electronic device, which is any one of a smart phone, a tablet computer, a notebook computer and an access control device (otherwise referred to as an entrance guard device).

In the embodiment, the photoelectric conversion device 220 and the light source are located at a first side 211 of the transparent substrate 210. The photoelectric conversion device 220 is configured to receive light reflected by the transparent substrate 210 and generate corresponding electrical signals. At least a portion of the transparent substrate 210 is made of flexible material, so that at least the portion of the transparent substrate 210 can fit a predetermined portion 10 of an organism with a curved interface at a second side 212 of the transparent substrate 210 during a biometric information acquisition process.

In some embodiments, the transparent substrate 210 comprises a transparent substrate in a flat panel display (FPD), the light source has a light-emitting side facing the transparent substrate 210 and comprises a backlight device in the FPD, and the biometric information is acquired through automatic optical inspection (AOI). Material of the transparent substrate 210 includes a transparent flexible material, such as resin. The photoelectric conversion device 220 comprises an array of photodiodes (PDs), each of which is configured to convert received light into a corresponding one of the electrical signals. A distance between centers of two adjacent ones of the photodiodes is not greater than 90 μm, that is, a pixel pitch of sensor is not greater than 90 μm.

In some embodiments, the first side 211 of the transparent substrate 210 is made of rigid material, and the second side 212 of the transparent substrate 210 is made of flexible material. Combining the rigid material with the flexible material is beneficial to fixing the transparent substrate 210, and is beneficial to fixing the photoelectric conversion device 220 onto the first side 211 of the transparent substrate 210, so that the PD array can be attached to the first side 211 of the transparent substrate 21.

Figure 2B:
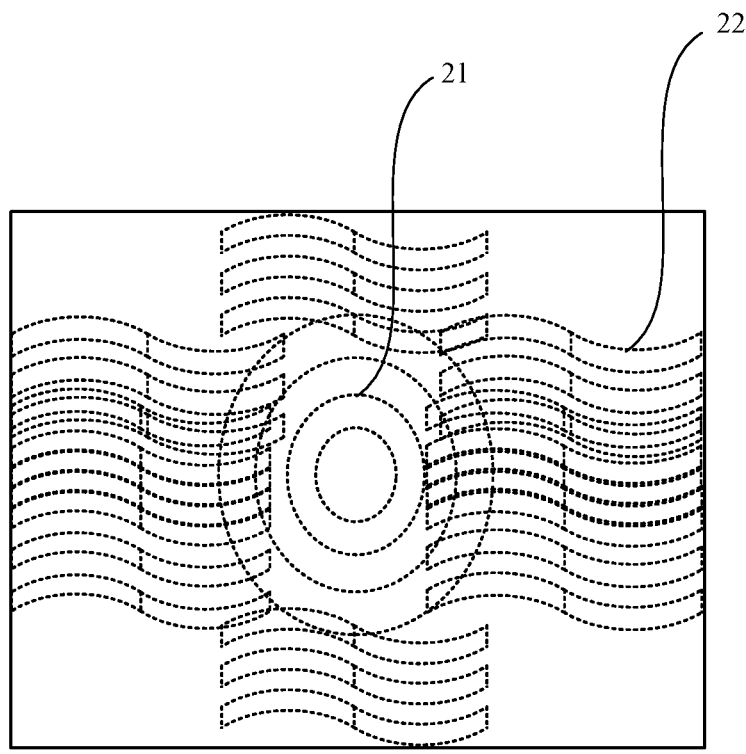
FIG. 2b shows a schematic diagram of a biometric information acquisition effect according to an embodiment of the present disclosure.

In this embodiment, the processing device is configured to acquire biometric information according to the electrical signals. As shown in FIG. 2b, the biometric information comprises: center texture information 21, peripheral texture information 22 and pore information (not shown) of the predetermined portion 10. In the processing device, the processing unit 231 is used to provide a control signal. The control unit 232 is configured to turn on a corresponding row of the photodiodes in the PD array according to the control signal, and light received by each photodiode is converted by that photodiode into a corresponding one of the electrical signals when that photodiode is turned on. The rectification feedback unit 233 is configured to generate an analog voltage signal according to the corresponding one of the electrical signals. The conversion unit 234 is configured to generate a digital signal according to the analog voltage signal and transmit the digital signal to the processing unit 231 which is configured to obtain an image to be detected representing the biometric information according to the digital signal. The analog voltage signal is sampled by the conversion unit 234 at a sampling frequency which is not less than 16 bits.

In some embodiments, an implementation of the processing unit 231 may be selected according to a real-time requirement of the system. In a case of using a streaming media transmission mode, the processing unit 231 may be implemented using a field programmable gate array (FPGA) or a graphics processing unit (GPU). In a case of using a single image transmission mode, the processing unit 231 may be implemented using a central process unit (CPU) or a microcontroller unit (MCU).

In some embodiments, the control unit 232 is implemented using a gate control circuit, which is configured to turn on the photodiodes in the PD array row by row.

In some embodiments, the rectification feedback unit 233 is implemented using a low noise signal conditioning amplification circuit, comprising: a charge acquisition amplification circuit, a signal filtering circuit and a bright-and-dark-correlated double sampling circuit.

In some embodiments, the conversion unit 234 is implemented using a 16-bit A/D converter.

In a case where the processing unit 231 is implemented using an FPGA, the FPGA can receive a digital signal from the rectification feedback unit through a digital interface, such as LVDS, SPI, or parallel port, and then transmit the digital signal to a PC through a communication interface, such as USB or Ethernet. In the biometric information acquisition system according to the embodiment of the present disclosure, central texture 21, peripheral texture 22 and arrangement information of the sweat pores of the predetermined portion 10 can be effectively distinguished, wherein, positions of the sweat pores will be described referring to FIGS. 4 to 6, but not shown in FIG. 2b.

Figure 3:
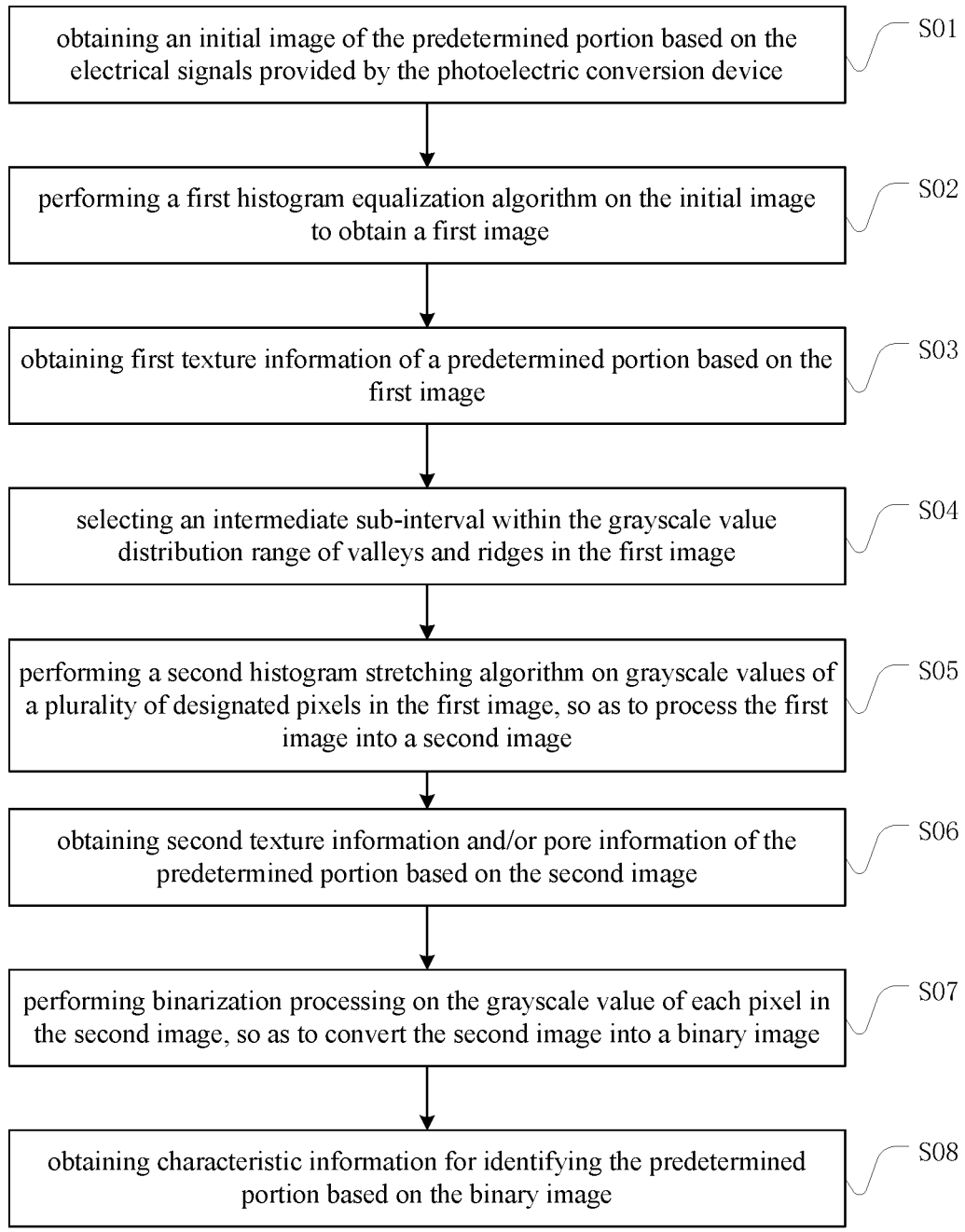
FIG. 3 shows a flowchart diagram of a processing method according to an embodiment of the present disclosure.
Figure 4:
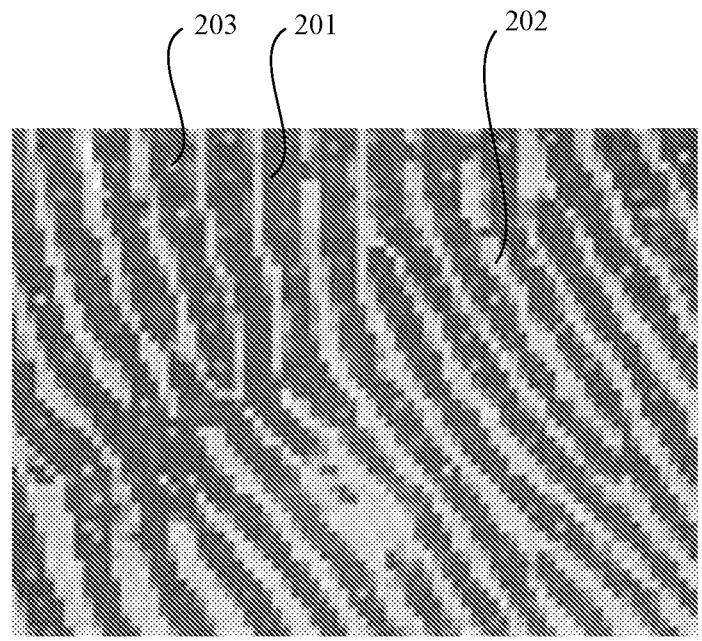
FIGS. 4 to 6 show schematic diagrams of processing effects corresponding to some steps of the processing method shown in FIG. 3.
Figure 5:
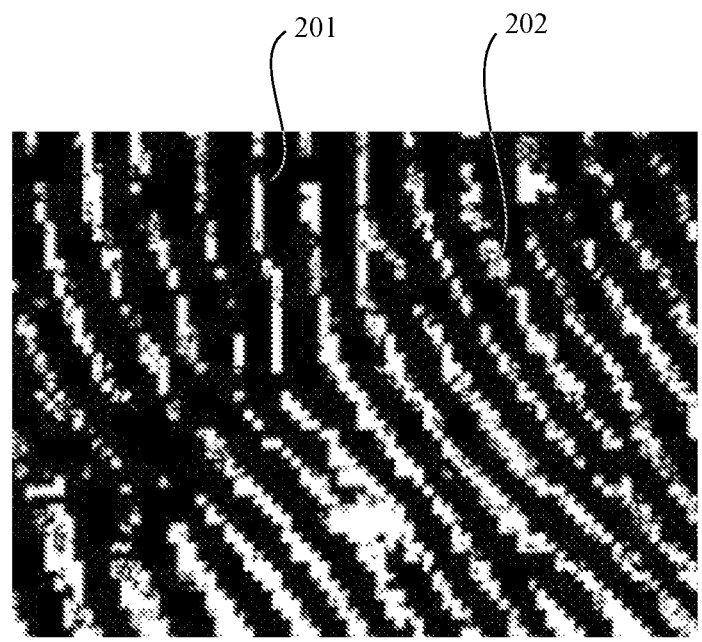
Figure 6:
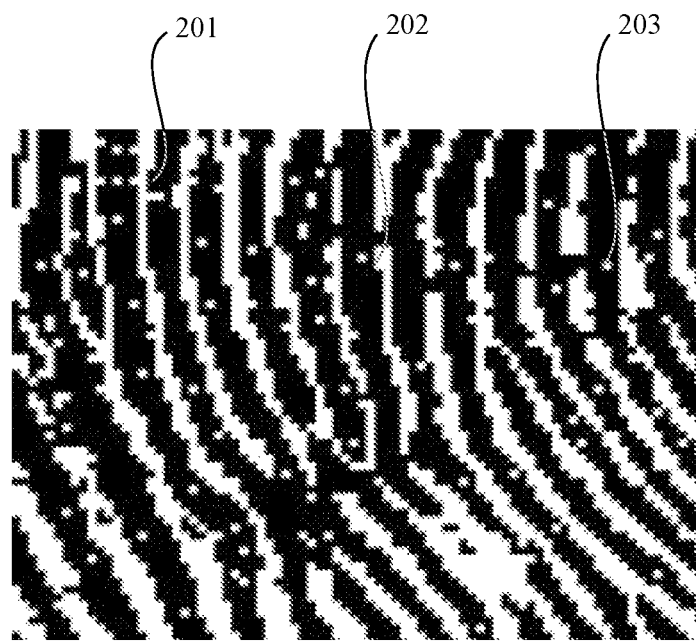

FIG. 3 shows a flowchart diagram of a processing method according to an embodiment of the present disclosure; and FIG. 4 to FIG. 6 show schematic diagrams of processing effects corresponding to some steps of the processing method shown in FIG. 3. The processing method according to embodiments of the present disclosure can be executed based on the biometric information acquisition system according to the embodiments of the present disclosure, on a premise that the predetermined portion fits the flexible material well, so that an image with better clarity and more obvious grayscale distribution of sweat pores and textures can be acquired, wherein a grayscale value distribution range of sweat pores may change within a grayscale value distribution range of valleys and ridges of the textures. The predetermined portion is, for example, a finger, and because the transparent substrate with flexible material can fit a curved surface of the finger well, light leakage in an AOI area is very weak, an influence, which is caused by external ambient light, on the grayscale values of the acquired image is reduced, therefore, the biometric information acquisition system according to the embodiments of the present disclosure can make a relative difference between the grayscale value of a finger ridge comprised in the finger texture and the grayscale value of a sweat pore as close to constant as possible, and on this basis, an image processing algorithm can be performed to process on the sweat pores and the finger texture according to the relative difference of the grayscale values. The processing method according to the embodiment of the present disclosure will be described in detail below with reference to FIG. 2b and FIGS. 3 to 6.

In step S01, an initial image of the predetermined portion is obtained based on the electrical signals provided by the photoelectric conversion device.

In this step, a finger is pressed on the portion, which is made of flexible material, of the transparent substrate 210 and the finger can fit the second side 212 of the transparent substrate 21 with a curved interface. The control unit 232 is configured to turn on the photodiodes in the PD array row by row according to the control signal provided by the processing unit 231, and each of the photodiodes converts the received light into a corresponding one of the electrical signals, such as a signal in form of charge, current and/or voltage. The electrical signals are processed by the rectification feedback unit 233 and the conversion unit 234 and then transmitted to the processing unit 231, so that the processing unit 231 can obtain the initial image according to the electrical signals, wherein a grayscale value variation range of valleys and ridges of the fingerprint can be obtained in the initial image.

In step S02, a first histogram equalization algorithm is performed on the initial image to obtain a first image, as shown in FIG. 4.

In this step, the first histogram equalization algorithm is performed on the initial image according to a boundary value of the grayscale value variation range of valleys 202 and ridges 201 of the fingerprint, a grayscale value distribution range of valleys 202 and ridges 201 in the first image is greater than a grayscale value distribution range of valleys and ridges in the initial image, and since the grayscale value variation range of sweat pores 203 may between a grayscale value variation range of valleys 202 and a grayscale value variation range of ridges 201, the information of sweat pores 203 can be retained with relatively high integrity after the first histogram equalization algorithm is executed. For example, the grayscale value variation range of valleys is (80, 100), the grayscale value variation range of ridges is (20, 25), and the boundary values of the grayscale value variation range of valleys and ridges are 20 and 100. However, embodiments of the present disclosure are not limited hereinto. Due to a difference on a factor, such as a difference on the light source, those skilled in the art can set a boundary value of the grayscale value variation range of valleys and ridges according to an actual need.

In step S03, first texture information of a predetermined portion is obtained based on the first image.

In this step, since the initial image is not interfered by too much ambient light, grayscales of sweat pores and textures of the initial image are already very obvious, so that, after the first histogram equalization algorithm is performed on the initial image, the texture information of valleys 202 and ridges 201 of the first image can be separated as the first texture information, as shown in FIG. 5. In some embodiments, whether the organism is an authenticated user can be judged based on the first texture information, for example, the first texture information can be compared with a standard first texture information to obtained a comparison result, and whether the organism is an authenticated user can be judged according to the comparison result, wherein, the standard first texture information is, for example, the first texture information which is previously entered by the user. In some embodiments, whether the organism is an authenticated user can be preliminarily judged based on the first texture information. If yes, subsequent steps S04 to S08 can be further executed; if not, return to the step S01.

In step S04, an intermediate sub-interval is selected within the grayscale value distribution range of valleys and ridges in the first image.

In this step, for example, the intermediate sub-interval is selected and ranges from 40% to 70% of the grayscale distribution range of valleys 202 and ridges 201. In the first image, it is assumed that the grayscale value variation range of the valleys is (60, 120), the grayscale value variation range of the ridges is (10, 35), and the boundary values of the grayscale value variation range of the valleys and ridges are 10 and 120. A difference between 120 and 10 is multiplied by 40% and 70%, respectively, and 10 is added to the products, respectively, so as to obtain the intermediate sub-interval (54, 87). However, the embodiments of the present disclosure are not limited to this, only a wide qualitative range is provided in the present disclosure, and a boundary value of the intermediate sub-interval should be finely adjusted according to a specific application scene because obtained images may be quite different based on different backlights or image light intensities.

In step S05, a second histogram stretching algorithm is performed on grayscale values of a plurality of designated pixels in the first image, so as to process the first image into a second image.

In this step, for example, the second histogram stretching algorithm is performed on the grayscale values of the plurality of designated pixels in the first image with the boundary values 54 and 87 of the intermediate sub-interval, in order to process the first image into the second image, the grayscale values of the plurality of designated pixels in the first image are distributed within the intermediate sub-interval, and the grayscale value distribution range of the plurality of designated pixels in the second image is greater than the grayscale value distribution range of the plurality of designated pixels in the first image.

As a selection range of the second histogram stretching algorithm is an effective interval of sweat pores and fingerprints, the information of sweat pores and fingerprints can be clearer after the second histogram stretching algorithm is performed, wherein, the effective interval is a grayscale value interval (i.e., the intermediate sub-interval) that can clearly display the valleys 202 and ridges 201, and the grayscale value distribution range of sweat pores 203 falls within the grayscale value distribution range of valleys 202 and ridges 201, so that the sweat pores 203 can also be clearly displayed within the effective interval.

In step S06, second texture information and/or pore information of the predetermined portion are obtained based on the second image.

In this step, since the valleys 202, the ridges 201, and the sweat pores 203 are all clearly displayed in the second image, the information of valleys 202 and ridges 201 can be taken as the second texture information, and the pore information includes the arrangement information of the sweat pores 203 or size information of each sweat pore, etc.

In step S07, binarization processing is performed on the grayscale value of each pixel in the second image, so as to convert the second image into a binary image.

In this step, a threshold of the binarization processing depends on the number of sweat pores to be identified.

In step S08, characteristic information for identifying the predetermined portion is obtained based on the binary image.

In this step, the characteristic information comprises fingerprint information, which is composed of valleys 202 and ridges 201, and the arrangement information of sweat pore 203, as shown in FIG. 6. The sweat pores 203 in the binary image can be separated by using the image shown in FIG. 5 as a mask, thereby the arrangement information of the sweat pores 203 can be obtained. In some embodiments, after preliminarily judging that the organism is an authenticated user based on the first texture information, whether the organism is an authenticated user is judged based on the characteristic information again, for example, the characteristic information can be compared with the standard characteristic information to obtain a comparison result, and whether the organism is an authenticated user can be judged again according to the comparison result, wherein, the standard characteristic information is, for example, the characteristic information previously entered by the user. Efficiency of processing the biometric characteristic information and judgment accuracy are both taken into account by two times of authentications, thus improving the security of the system.

It should be noted that the above-mentioned embodiment is only an optional embodiment of the present disclosure. The biometric information acquisition method according to embodiments of the present disclosure is not limited to be used in fingerprint or palmprint identification. The biometric information acquisition method according to embodiments of the present disclosure can also be applied to acquiring various texture characteristics, in particular to acquiring texture characteristics of, for example, lip prints and tongue prints, which are capable of being used for identification. The biometric information acquisition method according to embodiments of the present disclosure is not limited to being used for acquiring human information, but can also be used for acquiring biometric information of various animals and plants, such as acquiring nose textures of cats or dogs and veins of leaves.

According to the biometric information acquisition system and the processing method provided according to embodiments of the present disclosure, at least a portion of the transparent substrate is made of flexible material, so that the transparent substrate can fit the predetermined portion of the organism based on a curved interface during the biometric information acquisition process. Compared with the prior art, a contact area realized by fitting with the curved interface is larger than that a contact area realized by fitting with a tangential interface, so that more biometric characteristic information of the predetermined portion can be obtained at one time, and acquisition efficiency is improved. At the same time, fitting with the curved surface can reduce ambient light incident to the photoelectric conversion device, reduce an interference caused by the ambient light, and improve an accuracy of obtaining biometric information, thus improving security of the biometric information acquisition system.

Furthermore, since the ambient light incident to the photoelectric conversion device can be reduced, the interference of the ambient light can be reduced, not only central texture information and peripheral texture information can be clearly obtained, but also the biometric characteristic information of sweat pores can be obtained, which increases the difficulty of reproducing the characteristic information, thus further improving the security of the biometric characteristic information acquisition system.

Further, since the ambient light incident to the photoelectric conversion device is reduced, the interference of the ambient light can be reduced, the first histogram equalization algorithm or both the first histogram equalization algorithm and the second histogram stretching algorithm can be directly used to obtain the texture information and the pore information of the predetermined portion, thereby improving image processing speed.

In addition, since at least a portion of the transparent substrate in contact with the predetermined portion is made of flexible material, the biometric information acquisition system may not be easily damaged by an external stress.

It should be noted that relationship terms, such as "first" and "second", are used herein only for distinguishing one entity or operation from another entity or operation, but do not necessarily require or imply that there exists any actual relationship or sequence of this sort between these entities or operations. Furthermore, terms "comprising", "including" or any other variants are intended to cover the non-exclusive including, thereby making that the process, method, merchandise or device comprising a series of elements comprise not only those elements but also other elements that are not listed explicitly or the inherent elements to the process, method, merchandise or device. In the case of no more limitations, the element limited by the sentence "comprising a . . . " does not exclude that there exists another same element in the process, method, merchandise or device comprising the element.

The embodiments in accordance with the present disclosure, are illustrative but not exhaustive, and are not limited to the disclosed embodiments. Obviously, many modifications and changes are apparent to an ordinary person skilled in the art without departing from the scope and spirit of each embodiment of the present disclosure. These embodiments have been chosen and described in detail by the specification to explain the principles and embodiments of the present disclosure so that those skilled in the art can make good use of the present disclosure and the modified use based on the present disclosure. The present invention is limited only by the claims and their full scope and equivalents.

What is claimed is:

1. A biometric information acquisition system, comprising:
    a transparent substrate;
    a light source;
    a photoelectric conversion device, which is located at one side of the transparent substrate with the light source, and is configured to receive light reflected by the transparent substrate and generate corresponding electrical signals; and
    a processing device, configured to obtain biometric information according to the electrical signals,
    wherein at least a portion of the transparent substrate is made of flexible material,
    wherein the photoelectric conversion device comprises an array of photodiodes, and the processing device comprises:
    a processing unit, configured to provide a control signal;
    a rectification feedback unit, configured to generate an analog voltage signal according to a corresponding one of the electrical signals;
    a control unit, configured to turn on a corresponding row of photodiodes in the array according to the control signal, wherein each one of the photodiodes is configured to convert received light into a corresponding one of the electrical signals when that photodiode is turned on; and
    a conversion unit, configured to generate a digital signal according to the analog voltage signal and transmit the digital signal to the processing unit,
    wherein, the processing unit is configured to obtain an image to be detected representing the biometric characteristic information according to the digital signal.

2. A biometric information acquisition system, comprising:
    a transparent substrate;
    a light source;
    a photoelectric conversion device, which is located at one side of the transparent substrate with the light source, and is configured to receive light reflected by the transparent substrate and generate corresponding electrical signals; and
    a processing device, configured to obtain biometric information according to the electrical signals,
    wherein at least a portion of the transparent substrate is made of flexible material, wherein the processing device comprises a rectification feedback unit, configured to generate an analog voltage signal according to a corresponding one of the electrical signals, and the processing device is configured to generate a digital signal according to the analog voltage signal, and obtain an image to be detected representing the biometric characteristic information according to the digital signal.

3. The biometric information acquisition system according to claim 2, wherein the biometric information comprises central texture information, peripheral texture information and pore information of a predetermined portion of an organism.

4. The biometric information acquisition system according to claim 3, wherein the photoelectric conversion device comprises an array of photodiodes,
wherein, a distance between centers of two adjacent ones of the photodiodes is not greater than 90 µm.

5. The biometric information acquisition system according to claim 4, wherein the processing device further comprises:
a processing unit, configured to provide a control signal;
a control unit, configured to turn on a corresponding row of photodiodes in the array according to the control signal, wherein each one of the photodiodes is configured to convert received light into a corresponding one of the electrical signals when that photodiode is turned on;
and
a conversion unit, configured to generate the digital signal according to the analog voltage signal and transmit the digital signal to the processing unit,
wherein, the processing unit is configured to obtain the image to be detected representing the biometric characteristic information according to the digital signal.

6. The biometric information acquisition system according to claim 5, wherein the analog voltage signal is sampled by the conversion unit at a sampling frequency which is not less than 16 bits.

7. The biometric information acquisition system according to claim 2, wherein a light-emitting side of the light source faces the transparent substrate.

8. The biometric information acquisition system according to claim 2, the biometric information acquisition system contains an electronic device, which is any one of a smart phone, a tablet computer, a notebook computer and an access control device.

9. A processing method, which is implemented based on the biometric information acquisition system according to claim 2, comprising:

obtaining an initial image of the predetermined portion according to the electrical signals provided by the photoelectric conversion device;
performing a first histogram equalization algorithm on the initial image to obtain a first image, so as to make a grayscale value distribution range of valleys and ridges in the first image greater than a grayscale value distribution range of valleys and ridges in the initial image; and
obtaining first texture information of the predetermined portion based on the first image.

10. The processing method according to claim 9, further comprising:
selecting an intermediate sub-interval within the grayscale value distribution range of valleys and ridges in the first image;
performing a second histogram stretching algorithm on grayscale values of a plurality of designated pixels in the first image, so as to process the first image into a second image, wherein the grayscale values of the plurality of designated pixels are distributed within the intermediate sub-interval, and a grayscale value distribution range of the plurality of designated pixels in the second image is greater than a grayscale value distribution range of the plurality of designated pixels in the first image; and
obtaining second texture information and/or pore information of the predetermined portion based on the second image.

11. The processing method according to claim 10, further comprising:
performing binarization processing on a grayscale value of each pixel in the second image, so as to convert the second image into a binary image; and
obtaining characteristic information used for identifying the predetermined portion based on the binary image.

12. The processing method according to claim 11, further comprising:
preliminary judging whether the organism is an authenticated user based on the first texture information, and if so, judging whether the organism is an authenticated user again based on the characteristic information.

13. The processing method according to claim 9, further comprising:
judging whether the organism is an authenticated user based on the first texture information.

* * * * *